United States Patent [19]

Pass

[11] 3,896,293

[45] July 22, 1975

[54] CARD READER TRANSPORT MECHANISM

[75] Inventor: Raymond Vincent Pass, Camp Hill, Pa.

[73] Assignee: AMP Incorporated, Harrisburg, Pa.

[22] Filed: Aug. 6, 1973

[21] Appl. No.: 385,776

[52] U.S. Cl......... 235/61.11 R; 271/DIG. 9; 338/98; 340/149 A

[51] Int. Cl.$^2$...G06K 13/04; B65H 9/14; H01H 61/00

[58] Field of Search.................. 271/DIG. 9; 338/98; 340/149 A; 235/61.11 A, 61.11 B, 61.11 C, 61.11 D, 61.11 E, 61.11 J; 101/47; 360/2, 88

[56] References Cited

UNITED STATES PATENTS

| | | | |
|---|---|---|---|
| 806,009 | 11/1905 | Scott | 338/98 |
| 1,021,227 | 3/1912 | Zimmer | 338/98 |
| 2,392,127 | 1/1946 | Diehl | 338/98 |
| 3,048,097 | 8/1962 | Miller | 101/47 |
| 3,094,680 | 6/1963 | Blake | 338/98 |
| 3,419,710 | 12/1968 | Mathews | 235/61.11 D |
| 3,514,754 | 5/1970 | Schwend | 340/149 A |
| 3,571,799 | 3/1971 | Coker | 235/61.11 D |

OTHER PUBLICATIONS

G. W. Bowers and E. G. Lanen–"Credit Card Reader", IBM Tech. Disc. Bull., Vol. 9, No. 12, p. 1760–1761, May 1967.

*Primary Examiner*—Daryl W. Cook
*Assistant Examiner*—Robert M. Kilgore
*Attorney, Agent, or Firm*—Gerald K. Kita

[57] ABSTRACT

In a card reader of the type having a generally fixed read head or transducer for serially scanning across an encoded portion of an encoded card transported past the read head, by transport mechanism, the mechanism including an energy storing device receiving the card and expending the stored energy to displace the card past the read head, the mechanism further including an acceleration or velocity limiting device coupled to the energy storing device for limiting transport of the card to a constant velocity past the read head.

4 Claims, 4 Drawing Figures

CARD READER TRANSPORT MECHANISM

The present invention relates to a transport mechanism for transporting an encoded card past a read head of a card reader. The elements of the card reader are well known in the prior art and can be summarized as follows. The read head scans or wipes across an encoded portion of an encoded card which is serially transported past the read head by a suitable transport mechanism. The read head includes an electro-optic or electro-magnetic transducer which converts either raised embossments or magnetic coding within the encoded portion of the card into a usable signal which is supplied to a decoder circuit which is utilized to retrieve electronically stored information, to place in storage additional information or to provide a read out of information retreived from storage.

In the prior art the transport mechanism required to transport or displace the card serially past the read head usually consisted of a synchronous motor having a drive wheel or capstan drive which engaged the card and forcibly conveyed the card past the read head. Such a motor vastly contributed to the cost of the card reader when incorporated therein and consumed large amounts of power. In addition, the prior art card readers were bulky and required a large number of component parts in the power train for the motor driven transport mechanism.

According to the present invention, a purely mechanical card transport mechanism is utilized, thereby eliminating the power consumption, bulkiness and drive train of the prior art motor driven transport mechanism in a prior art card reader. The present invention does not require modification of the electronics of any card reader and therefore may be substituted for the transport mechanism of either embossed or magnetic card readers, wherein either the card or the read head is transported in serial scanning fashion to detect the information on the encoded portion of the card. In particular, the transport mechanism of the present invention is ideally suited for providing constant rate speed of displacement of the card past the read head and therefore may be substituted for any constant speed transport mechanism of the prior art.

It is therefore an object of the present invention to provide a card reader transport mechanism which displaces an encoded card at a constant rate of speed past a read head, enabling the read head to scan an encoded portion of the card.

Another object of the present invention is to provide a purely mechanical constant speed transport mechanism which imparts constant velocity displacement to an object such as an encoded card without a need for a motor driver.

Another object of the present invention is to provide a card reader transport mechanism for a card reader utilizing an automatically rewinding or reeling device opposed by an acceleration limiting device which limits rewinding of the reeling device to a constant winding rate, enabling transport of an encoded card at a constant velocity past a read head of a card reader to enable scanning of the read head across an encoded portion of the card.

Another object of the present invention is to provide in a card reader, of the type wherein an encoded portion of a card is transported at a constant velocity displacement past a read head to enable the read head to scan an encoded portion of the card, a transport mechanism in the form of a totally mechanical energy storing device which expends its stored energy to displace the card past the read head, with a throttling or limiting device which controls the rate at which the stored energy is expended, so as to limit displacement of the card past the read head to a constant velocity displacement.

Another object of the present invention is to provide a mounting structure for mounting a card reader transducer or read head in a fixed location, utilizing a simple adjustment mechanism to locate the read head or transducer in fixed position on a card reader and for correct alignment with an encoded portion of an encoded card transported serially past the read head or transducer.

Other objects and many attendant advantages of the present invention will become apparent upon perusal of the following detailed description taken in conjunction with the accompanying drawings, wherein.

Figures 1, 2:
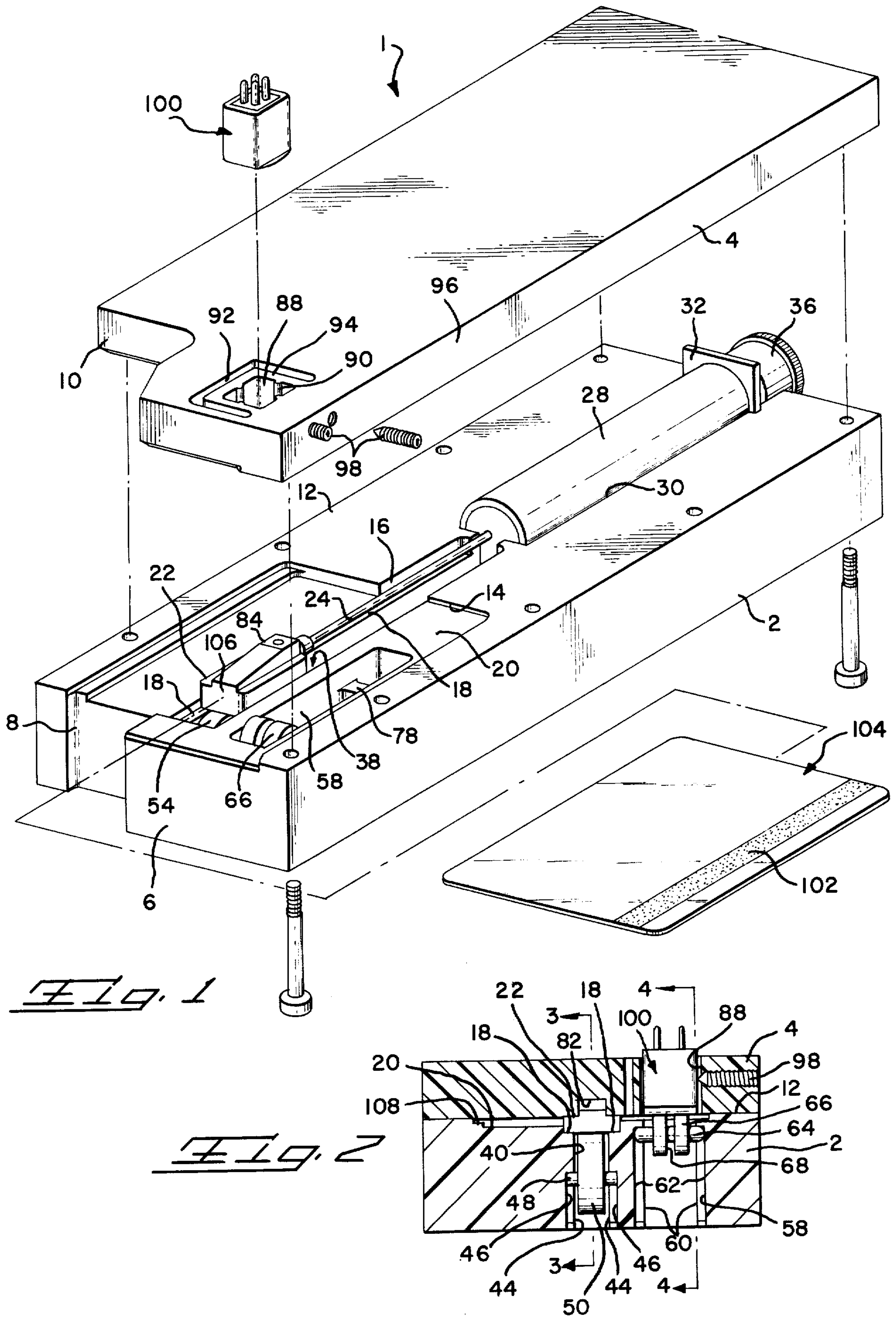
FIG. 1 is a perspective of a card reader transport mechanism according to the present invention with component parts thereof illustrated in exploded configuration to illustrate the details thereof; and further illustrating an encoded card and a read head of a card reader adapted for mounting to the transport mechanism according to the present invention.
FIG. 2 is a cross-section through the preferred embodiment illustrated in FIG. 1 further illustrating details of the assembled component parts.
Figure 3:
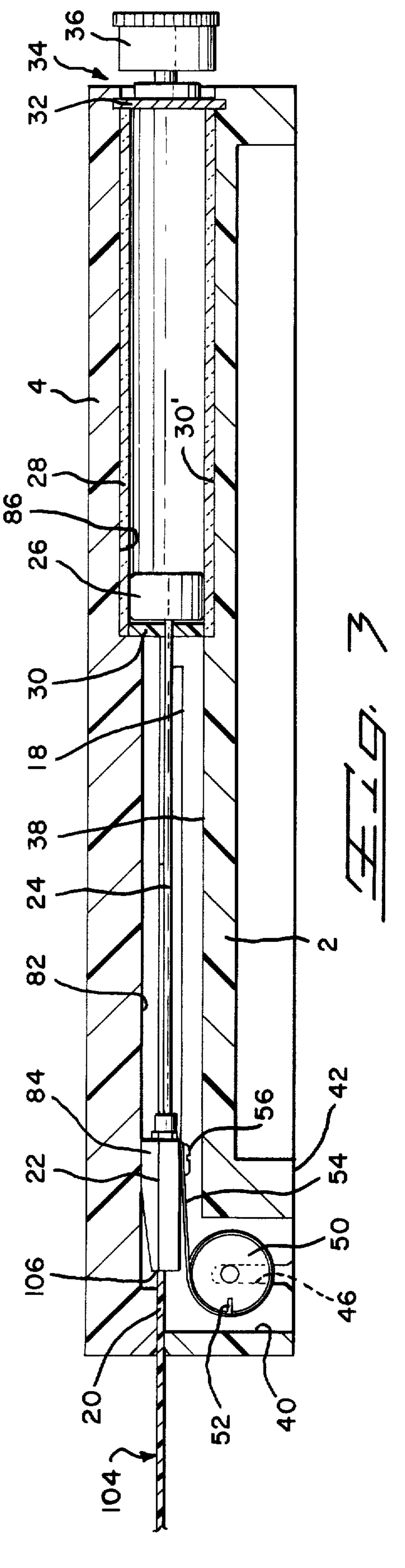
FIG. 3 is a longitudinal section taken generally along the line 3—3 of FIG. 2.

More particularly with reference to FIG. 1 of the drawings, there is illustrated generally at 1 a preferred embodiment of a card reader transport mechanism according to the present invention having a generally rectangular base portion 2 and a cover portion 4. One relatively short side-wall 6 of the base is provided with a relieved or corner notched portion 8. Similarly, the cover portion 4 is provided with a relieved or corner notched portion 10 to overlie and be coplanar with the notched portion 8. A top planar surface 12 of the base is provided with a generally rectangular shallow recess 14 which communicates with the sidewall 6 and also intersects the notched portion 8. One end of the recess 14 intersects the sidewall 6 while the opposite end of the recess 14 is provided with a substantially reduced relatively narrow necked recess portion 16. As shown generally at 18, the bottom wall portion of the recess portion 16 is in the form of a pair of parallel tracks 18 recessed below the level of the recessed portion 14 and below the recessed floor 20 of the recess 14. The parallel tracks 18 thereby slidably support a generally rectangular carriage 22 which is adapted to slidably displace along the parallel tracks 18. The carriage 22 comprises a displaceable element mounted to the end of a piston rod 24, which, in turn, as shown in FIG. 3, is secured to a generally cylindrical piston 26. The piston 26 is mounted for slidable reciprocation within a glass tube or casing 28 having end plates 30 and 32. The end plate 32 is provided with a variable restricting orifice generally illustrated at 34. The size of the orifice 34 is selectively adjustable by rotating a manually adjustable knob 36 mounted to a pillow block 38 on the end plate 32.

As shown more particularly in FIGS. 1 and 3, the assembly of the piston 26 and glass tube 28 is mounted within a semi-cylindrical recess 30′ provided in the top surface 12 of the base portion 2.

Immediately below the piston rod 24 and the carriage 22 is located an elongated channel 38. More particularly, the channel 38 is provided between the parallel tracks 18 and is substantially recessed with respect to the surface 20 of the base portion 2. In addition the channel 38 at one end, as shown in FIG. 3 intersects the longitudinal axis of the recess 30′ which contains the piston casing 28. At the other end of the channel 38 there is provided a substantially vertical recess 40 which extends and communicates with the channel end 38 and the bottom surface 42 of the base portion 2. As shown in FIGS. 2 and 3, the recess 40 provides a vertical channel having a width equal to the width of the channel 38. The width of the vertical channel 40 is defined by a pair of sidewalls 44 which are provided with inverted recesses 46 that form grooves in the sidewalls 46. The grooves 46 are aligned with respect to each other and receive the corresponding ends of a shaft 48 or spindle on which is mounted for rotation thereon a generally cylindrical spool 50. The spool periphery is provided with a radial slot 52 which receives one end of an elongated metal strip 54 which is concentrically wound or coiled over the cylindrical periphery of the spool 50. The strip 54 is advantageously in the form of a negator type spring which is well known in the prior art and consists of a metal strip of spring material which is arcuately bowed across its cross-section and which is preformed to have a resilient spring action tending to coil the spring upon itself concentrically. Upon unwinding or unreeling of the spring from its coiled position, a constant force will oppose the unreeling action, which constant force is provided by the stored resilient spring energy tending to reel, wind or coil the spring upon itself.

As shown in FIG. 3, the end of the spring 54 is secured to the undersurface of the carriage 22 by a common fastener such as a screw 56. The screw head advantageously is disposed within the channel 38 without touching or engaging the base portion 2.

Figure 4:
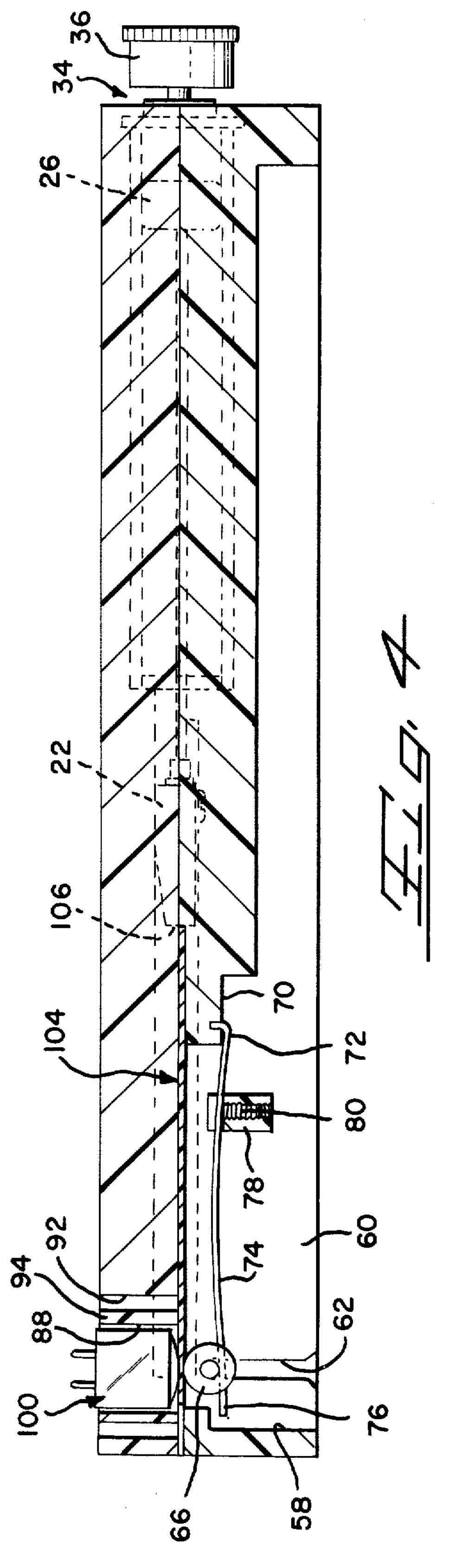
FIG. 4 is a longitudinal section generally taken along the line 4—4 of FIG. 2.

As shown in FIGS. 2 and 4, the base portion 2 is further provided with a generally rectangular opening 58 which vertically extends between and communicates with the top surface and the under surface 42 of the base portion 2. The opposite sidewalls 60 of the opening 58 are provided with vertical aligned grooves 62 terminating short of the surface 20 defining the bottom surface of the shallow recess portion 14. The grooves 62 are aligned and receive the corresponding ends of a shaft or spindle 64 on which is mounted thereon a spool or roller 66 which is bifurcated at 68. As shown in FIG. 4, the recess 58 is provided with an inverted shoulder 70 within which is embedded one end 72 of an elongated leaf spring 74. The other end of the leaf spring 76 is received in the bifurcated portion 68 of the spool 66. In addition, the recess 58 is provided with a web 78 bridging across the sidewalls 60 and positioned between the end portions 72 and 76 of the spring 74. The spring 74 overlies the web 78. A threaded shaft element 80 is adjustably threadably driven vertically within the web 78 to engage the spring 74. By properly vertically adjusting the element 80, the element 80 will bias the spring 74 and deflect it into engagement against the spool 66. By properly adjusting the element 80, the position of the spool 66 vertically within the aligned grooves 62 will thereby be adjustable.

As shown more particularly in FIGS. 2, 3 and 4, the cover portion 4 includes an inverted channel 82 receiving and overlying a raised relatively narrow spine portion 84 provided on the carriage 22. The channel 82 extends horizontally over the piston rod 24 and intercepts a generally semicylindrical recess 86 which receives a portion of the piston casing 28 therein, when the cover portion 4 is mounted over the base portion 2 as shown in FIGS. 2, 3 and 4. In addition, as shown in FIGS. 1, 2 and 4, the cover portion is provided with a generally rectangular or vertical aperture 88 overlying the spool 66 when the cover portion 4 is assembled to the base portion 2. Each planar side of the rectangular aperture 88 is provided with a vertical semi-cylindrical projecting bead 90. Three sides of the aperture 88 are encircled by a slot 92 leaving a relatively thin vertical web 94 encircling three sides of the aperture 88. The remaining side of the aperture 88 is adjacent to a sidewall 96 of the cover portion 4. The sidewall 96 is provided with a pair of externally threaded cylindrical elements 98 received into corresponding internally threaded apertures provided in the sidewall 96. The threaded elements 98 project into and through the remaining side of the rectangular aperture 88. The aperture 88 advantageously supplies a structure capable of receiving or adapted to receive, a read head or transducer of any well known type utilized in a card reader. For example, there is illustrated generally at 100 a generally rectangular magnetic read head or transducer of a type well known in the prior art. The transducer 100 may be vertically received within the aperture 88, with the projecting beads 90 thereof maintaining the read head 100 in proper alignment as desired. In addition, the members 98 may be individually threadably adjusted to further align the read head in a desired angular fixed position within the cover portion 4.

In operation, the read head 100, by way of example, may be a magnetic type read head adapted to serially scan across an encoded portion 102 of an exemplary encoded card indicated generally at 104. The encoded portion 102 is in the form well known in the prior art and consists of a magnetically encoded stripe. The card 104 is adapted to be transported serially past the read head by the transport mechanism of the present invention enabling the read head 100 to scan in serial fashion along the length of the magnetically encoded stripe 102.

It should be understood also that the exemplary card 104 may be of the type containing a serial array of raised embossments in place of the stripe 102. In such case, the exemplary read head 100 may comprise an electro-optic card reader transducer of the type described in U.S. Pat. No. 3,706,874. Accordingly, the transport mechanism of the present invention is suitably adapted for reading either magnetically encoded or embossed encoded cards, and is capable of providing a mounting structure for receiving an exemplary read head which reads or scans magnetic encoded cards or embossed encoded cards.

The detailed operation of the present invention is described with reference to FIGS. 3 and 4, wherein FIG. 3 illustrates that the exemplary card 104 is initially inserted into the recess 14 by an operator of the transport mechanism. Initially the end or edge of the card 104 thus is engaged against the end 106 of the carriage 22. The operator then manually displaces the card or fully inserts the card into the recess 14 and thereby displaces the carriage 106 from left to right, as shown in FIGS. 3 and 4. The relieved portions 8 and 10 allow the card to be fully displaced or inserted within the recess 14. This causes the piston 26 to slidably traverse within the length of the piston casing 28 to its position shown by phantom outline in FIG. 4. The carriage 22 also is displaced to its phantom outline position shown in FIG. 4. The carriage 22 is therefore capable of receiving in engagement thereagainst the edge of the card 104 while the carriage is displaced from its first position shown in FIG. 3 to its second position shown in phantom outline in FIG. 4. As the carriage is thus displaced from its first position to its second position, the spring 54 will unreel from the spool 50 which is allowed to rotate to allow unreeling of the spring 54. Since the spring 54 is of the negator type, spring energy is stored in the spring as it is unreeled. Accordingly, when the card 104 is fully displaced from left to right as shown in FIGS. 3 and 4, the spring 54 is responsive to such displacement of the card and the carriage 22 to store the resilient spring energy therein which will force the spring 54 to automatically rewind or reel or coil itself concentrically upon the spool 50. This is accomplished by merely the operator releasing the card 104 while in its position shown in FIG. 4, allowing the resilient stored spring energy to expend and forcibly displace or transport the card and the carriage 22 from right to left, returning the carriage, from its second position shown in phantom outline in FIG. 4, to its first position shown in FIG. 3. In so doing, the encoded portion 102 of the card will be transported past the read head, allowing the read head 100 to serially scan the encoded portion 102 of the card in the operation of a card reader familiar to one having ordinary skill in the art. The spring 54 and spool 50 may therefore be considered an automatic reeling or automatic rewinding device which is responsive to displacement of the carriage or the unreeling of the spring element 54 to forcibly displace the carriage and return it from its second position as shown in FIG. 4 to its first position shown in FIG. 3. In addition, the spring 54 and spool 50 may be considered to be a retraction mechanism or an energy storing mechanism which retracts the carriage from its second position to its first position expending its stored spring energy to effect retraction. According to a feature of the present invention, the spring element 56 is connected by means of the carriage 22 to the piston element 26. The piston element 26 comprises a fluidic dash pot of the type available in the prior art and supplied by the Airpot Corporation, Norwalk, Conn., Model No. 48029-1 and described in U.S. Pat. No. 3,175,646, wherein the variable orifice 34 may be adjusted to throttle the rate at which ambient air enters the casing 26 and thereby throttle the rate at which the piston is returned to its position shown in FIG. 4, and the rate at which the automatic rewinding or reeling occurs. In addition, the piston element 26 is so constructed as to oppose the rewinding or reeling action to limit the acceleration and the velocity thereof. Such a feature is deemed important so as to transport the card 104 at a constant rate velocity past the read head 100, enabling constant speed scanning of the read head. The piston element 26 therefore is a velocity and acceleration limiting device connected to the spring 54 to oppose the resilient stored spring energy, or alternatively, the automatic rewinding or reeling feature; and to limit such rewinding or reeling to a constant rate. To minimize the friction as the card is transported from right to left, as shown in FIGS. 3 and 4, during scanning of the read head 100 over the encoded portion 102 of the card, the preferred embodiment utilizes the spool 66 as a roller supporting the card in spaced relationship above the surface 20 of the base portion 2. The cantilever spring 74 forcibly urges the roller 66 toward the overlying read head 100 to ensure the encoded portion 102 of the card is forced against the read head and is suitably wiped or scanned by the read head 100 maintained in close proximity to the surface of the card 104. In addition, the relatively narrow tracks 18 provide relatively low friction bearing surfaces slidably supporting the carriage 22 thereon. The spine 84 is tapered and is of minimum dimensions so as to slide freely with low friction within the inverted channel 82 provided in the cover portion 4. To further minimize sliding friction of the card over the base portion 2, there is shown in FIG. 2, a raised track 108 of narrow width which is used to support the card at a location in spaced relationship from the roller or spool 66. The cover portion 4 provides a proper structure for aligning the read head 100 vertically as desired, with the threadable elements 98 being threadably adjustable to adjust the angularity with respect to a vertical axis of the read head 100 so as to position the read head fixedly in position within the cover portion 4.

Although a preferred embodiment of the present invention has been described and illustrated in detail, other embodiments and modifications of the present invention which would be obvious to one having ordinary skill in the art is intended to be covered by the spirit and scope of the appended claims, wherein:

What is claimed is:

1. In a card reader transport mechanism, the combination comprising;

a base, a transducer mounted above said base and adapted to serially scan across an encoded portion of an encoded card which is transported past said transducer, wherein said transport mechanism is adapted to transport said card serially past said transducer, the improvement comprising:

an energy storing mechanism comprising a reeling device which is provided with a reeled strip capable of automatically rewinding in reeled configuration on said reeling device, said energy storing mechanism being responsive to the displacement of said card from a first position to a second position to store energy thereby, said displacement of said card from said first position to said second position creates unreeling of said strip from said reeling device, said energy storing mechanism expending the stored energy at a constant rate to rewind said strip and thereby displace said card from said second position to said first position, thereby transporting said card serially past said transducer, and a throttling device coupled to said energy storing mechanism for controlling the rate at which the stored energy is expended so as to limit displacement of said card to a constant velocity past said transducer, said throttling device being in the form of a fluidic dash-pot opposing the automatically rewinding strip and thereby limiting the rate of rewinding of said strip to a constant rate.

2. A card reader transport mechanism, comprising:

a base, a displaceable element mounted on said base and adapted for manual displacement from a first position to a second position along said base, a retraction mechanism responsive to displacement of said element to said second position to cause return displacement of said element to said first position, said displaceable element adapted to be engageable on an encoded card to transport said card upon displacement of said element from said second position to said first position, means on said base for mounting a read head in fixed position on said base whereby said read head is adapted to serially scan across the encoded card upon transport thereof from said second position to said first position, and a dash-pot mounted on said base and opposing said retraction mechanism for controlling the velocity of said displacement of said card past said read head.

3. The structure as recited in claim 2, wherein, said dash-pot includes a piston slidably traversable within an outer casing, said piston having a rod coupled to said retraction mechanism, and said casing having a selectively variable orifice which may be adjusted to throttle the rate at which ambient air enters said casing to thereby throttle the rate at which said piston is traversed within said casing .

4. The structure as recited in claim 2, and further including: a roller, and means for resiliently biasing said roller toward said read head, whereby said encoded card is receivable between said read head and said roller upon transport of said card from said second position to said first position.

* * * * *